3,260,768
OXIDATIVE DEHYDROGENATION OF OLEFINS USING AN ANTIMONY OXIDE-IRON OXIDE CATALYST
James L. Callahan, Bedford, Ohio, Berthold Gertisser, New York, N.Y., and Robert Grasselli, Cleveland, Ohio, assignors to The Standard Oil Company, Cleveland, Ohio, a corporation of Ohio
No Drawing. Filed June 11, 1962, Ser. No. 201,330
6 Claims. (Cl. 260—680)

This invention relates to the catalytic oxidative dehydrogenation of olefins to diolefins, such as butene-1 to butadiene, and tertiary amylenes to isoprene, using an improved oxidation catalyst consisting essentially of oxides of the elements antimony and iron.

U.S. Patent No. 2,904,580, dated September 15, 1959, describes a catalyst composed of anitmony oxide and molybdenum oxide, as antimony molybdate, and indicates its utility in converting propylene to acrylonitrile.

British Patent 864,666, published April 16, 1961, describes a catalyst composed of an antimony oxide alone or in combination with a molybdenum oxide, a tungsten oxide, a tellurium oxide, a copper oxide, a titanium oxide, or a cobalt oxide. These catalysts are said to be either mixtures of these oxides or oxygen-containing compounds of antimony with the other metal; such as antimony molybdate or molybdenum antimonate. These catalyst systems are said to be useful in the production of unsaturated aldehydes such as acrolein or methacrolein from olefins such as propylene or isobutene and oxygen.

British Patent 876,446, published August 30, 1961, describes catalysts including antimony, oxygen, and tin, and said to be either mixtures of antimony oxides with tin oxides, or oxygen-containing compounds of antimony and tin such as tin antimonate. These catalysts are said to be useful in the production of unsaturated aliphatic nitriles such as acrylonitrile from olefins such as propylene, oxygen and ammonia.

I. THE CATALYST

In accordance with the invention, an oxidation catalyst is provided consisting essentially of oxides of antimony and iron. This catalyst is useful not only in the oxidation of olefins to oxygenated hydrocarbons such as acrolein and the oxidation of olefin-ammonia mixtures to unsaturated nitriles such as acrylonitrile, but also in the catalytic oxidative dehydrogenation of olefins to diolefins.

The nature of the chemical compounds which compose the catalyst of the invention is not known. The catalyst may be a mixture of antimony oxide or oxides and iron oxide or oxides. It is also possible that the antimony and iron are combined with the oxygen to form an antimonate. X-ray examination of the catalyst systems has indicated the presence of a structurally common phase of the antimony type, composed of animony oxides, and some form of iron oxide. Antimony tetroxide has been identified as present. For the purposes of description of the invention, this catalyst system will be referred to as a mixture of antimony and iron oxides, but this is not to be construed as meaning that the catalyst is composed either in whole or in part of these compounds.

The proportions of antimony and iron in the catalyst system may vary widely. The Sb:Fe atomic ratio can range from about 1:50 to about 99:1. However, optimum activity appears to be obtained at Sb:Fe atomic ratios within the range from 1:1 to 25:1.

The catalyst can be employed without support, and will display excellent activity. It also can be combined with a support, and preferably at least 10% up to about 90% of the supporting compound by weight of the entire composition is employed in this event. Any known support materials can be used, such as, for example, silica, alumina, zirconia, alundum, silicon carbide, alumina-silica, and the inorganic phosphates, silicates, aluminates, borates and carbonates stable under the reaction conditions to be encountered in the use of the catalyst.

The antimony oxide and iron oxide can be blended together, or can be formed separately and then blended, or formed separately or together in situ. As starting materials for the antimony oxide component, for example, there can be used any antimony oxide, such as antimony trioxide, antimony tetroxide and antimony pentoxide, or mixtures thereof, or a hydrous antimony oxide, metaantimonic acid, orthoantimonic acid or pyroantimonic acid; or a hydrolyzable or decomposable antimony salt, such as an antimony halide, for example, antimony trichloride, trifluoride or tribromide; antimony pentachloride and antimony pentafluoride, which is hydrolyzable in water to form the hydrous oxide. Antimony metal can be employed, the hydrous oxide being formed by oxidizing the metal with an oxidizing acid such as nitric acid.

The iron oxide components can be provided in the form of ferrous, ferric or ferrous-ferric oxides or by precipitation in situ from a soluble iron salt such as the nitrate, acetate, or a halide such as the chloride. Metallic iron can be used as a starting material, and if antimony metal is also employed, the antimony can be converted to the oxide and the iron to the nitrate simultaneously by oxidation in hot nitric acid. A slurry of hydrous antimony oxide in nitric acid can be combined with a solution of an iron salt such as ferric nitrate, which is then precipitated in situ as the hydroxide by making the solution alkaline with ammonium hydroxide; the ammonium nitrate and the other ammonium salts being removed by filtration of the resulting slurry.

It will be apparent from the above that ferrous and ferric bromides, chlorides, fluorides, and iodides, nitrites, acetates, sulfites, sulfates, phosphates, thiocyanates, thiosulfates, oxalates, formates and hydroxides can be employed as the source of the iron oxide component.

The catalytic activity of the system is enhanced by heating at an elevated temperature. Preferably, the catalyst mixture is dried and heated at a temperature of from about 500 to about 1150° F., preferably at about 700 to 900° F. for from two to twenty-four hours. If activity then is not sufficient, the catalyst can be further heated at a temperature above about 1000° F. but below a temperature deleterious to the catalyst at which it is melted or decomposed, preferably from about 1400° F. to about 1900° F. for from one to forty-eight hours, in the presence of air or oxygen. Usually, this limit is not reached before 2000° F. and in some cases the temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed can be replaced.

The antimony oxide-iron oxide catalyst composition of the invention can be defined by the following empirical formula:

$$Sb_aFe_bO_c$$

where $a$ is 1 to 99, $b$ is 50 to 1, and $c$ is a number taken to satisfy the average valences of antimony and iron in the oxidation states in which they exist in the catalyst as defined by the empirical formula above. Thus, the Sb valence may range from 3 to 5 and the Fe valence from 2 to 3.

II. THE OXIDATIVE DEHYDROGENATION OF OLEFINS TO DIOLEFINS AND AROMATICS

In accordance with the present invention, this catalyst system is employed in the catalytic oxidative dehydrogenation of olefins to diolefins and aromatics. In this process, the feed stream in vapor form containing the olefin to be dehydrogenated and oxygen is conducted over the catalyst at a comparatively low temperature to obtain the corresponding diolefin or aromatic compound.

By the term "olefin" as used herein is meant the open chain as well as cyclic olefins. The olefins dehydrogenated in accordance with the invention have at least four and up to about eight nonquaternary carbon atoms, of which at least four are arranged in series in a straight chain or ring. The olefins preferably are either normal straight chain or tertiary olefins. Both cis and trans isomers, where they exist, can be dehydrogenated.

Among the many olefinic compounds which can be dehydrogenated in this way are butene-1; butene-2; pentene-1; pentene-2, tertiary pentenes having one tertiary carbon atoms such as 2-methyl-pentene-1, 3-methylbutene-1, 2-methylbutene-2, hexene-1, hexene-2, 4-methyl-pentene-1, 3,4-dimethyl-pentene-1, 4-methyl-pentene-2, heptene-1, octene-1, cyclopentene, cyclohexene, 3-methyl cyclohexene, and cycloheptene.

Open chain olefins yield diolefins, and in general, six-membered ring olefins yield aromatic ring compounds. The higher molecular weight open chain olefins may cyclize to aromatic ring compounds.

The feed stock in addition to the olefin and oxygen can contain one or more paraffinic or naphthenic hydrocarbons having up to about 10 carbon atoms, which may be present as impurities in some petroleum hydrocarbon stocks and which may also be dehydrogenated in some cases. Propylene and isobutylene should not be included in substantial amounts.

The amount of oxygen should be within the range from about 0.3 to about 3 moles per mole of olefin. Stoichiometrically, 0.5 to 1.5 moles of oxygen per mole of olefin is required for the dehydrogenation to diolefins and aromatics, respectively. It is preferred to employ an excess, from 1 to about 2 moles per mole of olefin, in order to ensure a higher yield of diolefin per pass. The oxygen can be supplied as pure or substantially pure oxygen or as air or in the form of hydrogen peroxide.

When pure oxygen is used, it may be desirable to incorporate a diluent in the mixture, such as steam, carbon dioxide, or nitrogen.

The feed stock is preferably catalytically dehydrogenated in the presence of steam, but this is not essential. Usually, from about 0.1 to about 6 moles of steam per mole of olefin reactant is employed, but amounts larger than this can be used.

The dehydrogenation proceeds at temperatures within the range from about 325° C. to about 1000° C. Optimum yields are obtainable at temperatures within the range from about 400 to about 550° C. However, since the reaction is exothermic, temperatures in excess of 550° C. should not be used, unless means is provided to carry off the heat liberated in the course of the reaction. Due to the exothermic nature of the reaction, the temperature of the gaseous reaction mixture may be higher than the temperature of the feed entering the system by as much as 75° C. The temperatures referred to are those of the entering gas feed near the reactor inlet.

The preferred reaction mixture is approximately atmospheric, within the range from about 5 to about 75 p.s.i.a. Higher pressures up to about 300 p.s.i.a. can be used and have the advantage of simplifying the product recovery.

Only a brief contact time with the catalyst is required for effective dehydrogenation. The apparent contact time with the catalyst can range from about 0.5 to about 50 seconds but higher contact times can be used if desired. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture. At these contact times, comparatively small reactors and small amounts of catalysts can be used effectively.

The catalyst can be supplied in the form of tablets or pellets suitable for use in a fixed bed, with or without a support, maintained at the reaction temperature, passing the feed vapors through the bed. In this method of operation, the partial pressure of oxygen is high at the inlet and low at the outlet. The concentration of diolefin, on the other hand, is substantially zero at the inlet and at a maximum at the outlet.

The catalyst can also be provided in the form of a "fluidized" bed employing the catalyst in powdered form.

The reactor may be brought to the reaction temperature before or after the introduction of the vapors to be reacted. In a large scale operation, it is preferred to carry out the process in a continuous manner and in this system the recirculation of unreacted olefin and/or oxygen is contemplated. Periodic regeneration or reactivation of the catalyst is also contemplated. This may be accomplished, for example, by contacting the catalyst with air at an elevated temperature.

The effluent from the reaction zone can be quenched, but normally this is not required, inasmuch as there is little tendency for side reaction to take place, particularly at the preferred temperature range. The effluent can then be washed with a dilute alkaline solution to neutralize any acids present, and remove the steam. If air is used as a source of oxygen the effluent is then compressed and scrubbed with oil to separate the hydrocarbons from the nitrogen, carbon dioxide and carbon monoxide. The hydrocarbons may then be stripped from the oil, and subjected to an extractive distillation or a copper ammonia acetate treatment to separate and recover the diolefin. Unreacted olefin can be recycled to the reactor.

The following Example in the opinion of the inventors represent preferred embodiments of the process of oxidative dehydrogenation of olefins in accordance with the invention.

Example

The following procedure was employed to prepare a catalyst having an Sb/Fe atomic ratio of 8.7/1. 200 g. of antimony metal (less than 270 mesh) was heated in 826.7 cc. of concentrated nitric acid until all red oxides of nitrogen had been given off. To this was added an aqueous solution of 76 g. of ferric nitrate nonahydrate. The slurry was diluted with approximately 400 cc. of water. Approximately 500 cc. of 28% ammonium hydroxide was added, bringing the pH to from 7.6 to 8.0. The slurry was filtered and washed with 4000 cc., divided into three portions, of 2.5% ammonium hydroxide solution. Air was drawn through the filter cake for 15 minutes following the last washing. The catalyst was dried overnight at 130° C., calcined at 800° F. overnight, and heat-treated overnight at 1400° F. in a furnace open to the atmosphere.

The activity of this catalyst in the oxidative dehydrogenation of butene-1 to butadiene was determined using a reactor having a capacity of approximately 100 ml. of catalyst charge in a fixed bed. The feed gases were metered by Rotameters, and water was fed by means of a pump through capillary cooper tubing. In the tests, a 90 ml. catalyst charge was used. The feed ratio butene-1/air/nitrogen/water was 1/3/4/1. The contact time was 10 seconds, and the temperature was maintained at 910–940° F. at atmospheric pressure. The total conversion of the butene was 53.5%, the conversion to butadiene being 41%, with the remainder being carbon oxides and traces of other materials.

The percent conversion is expressed as:

Percent total conversion =
$$100 \times \frac{\text{moles of olefin fed} - \text{moles of olefin recovered}}{\text{moles of olefin fed}}$$

Percent diolefin conversion =
$$100 \times \frac{\text{moles of diolefin recovered}}{\text{moles of olefin fed}}$$

We claim:

1. The process for the oxidative dehydrogenation of olefins to diolefins which comprises contacting a mixture of oxygen and an olefin having at least four up to about eight nonquaternary carbon atoms, of which at least four are arranged in a series, in the vapor phase at a temperature at which the oxidative dehydrogenation proceeds with a catalyst consisting essentially of an active catalytic oxide complex of antimony and iron, the Sb:Fe atomic ratio being within the range from about 1:50 to about 99:1, said complex being formed by heating the mixed oxides of antimony and iron in the presence of oxygen at an elevated temperature of above 500° F. but below their melting point for a time sufficient to form said active catalytic oxide complex of antimony and iron.

2. The process in accordance with claim 1, wherein the catalyst has an Sb:Fe atomic ratio of from 1:1 to 25:1.

3. The process in accordance with claim 1, in which the reaction is carried out at a temperature within the range from about 325 to about 1000° C.

4. The process in accordance with claim 1, in which the olefin has from about four to about eight carbon atoms in a straight chain.

5. The process in accordance with claim 1, in which the proportion of oxygen in the feed is maintained at from 0.3 to 3 moles per mole of olefin.

6. The process in accordance with claim 1, wherein the olefin is a butene.

References Cited by the Examiner

UNITED STATES PATENTS

| | | | |
|---|---|---|---|
| 1,975,476 | 10/1934 | Pier et al. | 252—456 |
| 2,945,900 | 7/1960 | Alexander et al. | 260—680 |
| 3,142,697 | 7/1964 | Jennings et al. | 252—456 X |
| 3,159,688 | 12/1964 | Jennings et al. | 260—680 |

FOREIGN PATENTS

| | | |
|---|---|---|
| 1,287,214 | 1/1962 | France. |
| 902,952 | 8/1962 | Great Britain. |

PAUL M. COUGHLAN, *Primary Examiner.*

ALPHONSO D. SULLIVAN, *Examiner.*